(12) United States Patent
MacMillan (10) Patent No.: US 7,114,869 B2
(45) Date of Patent: Oct. 3, 2006

(54) BALL JOINT SYSTEM FOR DRYWALL FINISHING TOOLS

(75) Inventor: Donald Mark MacMillan, Richmond (CA)

(73) Assignee: Northstar Tool Corporation, Burnaby (CA)

(*) Notice: Subject to any disclaimer, the term of this patent is extended or adjusted under 35 U.S.C. 154(b) by 119 days.

(21) Appl. No.: 10/729,435

(22) Filed: Dec. 5, 2003

(65) Prior Publication Data

US 2005/0005386 A1    Jan. 13, 2005

Related U.S. Application Data

(60) Provisional application No. 60/431,642, filed on Dec. 5, 2002.

(51) Int. Cl.
  *B05C 11/04*    (2006.01)
  *B05C 17/10*    (2006.01)
  *F16C 11/06*    (2006.01)

(52) U.S. Cl. .................... 401/5; 401/139; 401/266; 403/144; 425/87; 15/235.7

(58) Field of Classification Search ................ 401/5, 401/48, 139, 266; 403/90, 135–138, 143, 403/144; 285/267–270; 425/87; 15/235.7
See application file for complete search history.

(56) References Cited

U.S. PATENT DOCUMENTS

| | | | | |
|---|---|---|---|---|
| 1,402,545 A | * | 1/1922 | Springborn | 285/94 |
| 5,622,729 A | * | 4/1997 | Mower | 425/87 |
| 6,155,809 A | * | 12/2000 | Edwards et al. | 425/87 |

* cited by examiner

*Primary Examiner*—Justine R. Yu
*Assistant Examiner*—Peter deVore
(74) *Attorney, Agent, or Firm*—Oyen Wiggs Green & Mutala LLP (57) ABSTRACT

The present disclosure describes drywall tools that employ rotatable joints, e.g., ball joints, and methods of using such tools. One particular implementation of a drywall tool includes a body having a recess adapted to pivotably receive a rounded connector of a handle. A retainer carried by the body includes first and second rods. Each of the rods is rotatable about an axis and has a non-uniform circumference with respect to that axis such that such that a surface of the rod is spaced farther from a recess axis of the recess when in its open position than when in its closed position.

14 Claims, 8 Drawing Sheets

BALL JOINT SYSTEM FOR DRYWALL FINISHING TOOLS

CROSS-REFERENCE TO RELATED APPLICATION

This application claims benefit of U.S. Provisional Application 60/431,642, filed 5 Dec. 2002.

TECHNICAL FIELD

The present invention generally relates to mechanical joints. More specifically, embodiments of the invention provide releasable locking systems for such joints and methods of assembling and/or disassembling such joints. One embodiment of the invention has been found particularly useful in pivotably joining a tool, e.g., a drywall tool, to a handle.

BACKGROUND

When installing drywall, one generally must cover a joint between adjacent sheets of drywall with joint tape, then apply a joint compound, commonly referred to as "mud," over the tape to provide a smoother wall surface. Although the mud can be applied with a drywall knife, this is rather time consuming, so contractors use specialized tools to apply mud at a controlled thickness. The proper drywall tool for a task will depend in part on the angle of the joint between adjacent sheets. If the joint between two adjacent sheets is along a flat wall, a flat finisher is commonly employed. If the joint is in a corner, e.g., a 90° joint between adjacent walls or between the wall and the ceiling, a corner finisher may be employed. Flat finishers and corner finishers are available from a variety of sources, including NorthStar Tool of Burnaby, BC, Canada.

Corner finishers can be used for different purposes at different stages of the drywall installation process. When the joint tape has been applied, the corner finisher may be used to wipe down any excess mud. After this tape sets, the corner finisher may be used to deliver additional mud and provide a uniform, flat finish coat. Corner finishers are typically mounted on a handle using a ball joint so the user can apply consistent pressure as the angle of the handle with respect to the corner finisher changes along the length of the joint.

Some manufacturers provide a series of handles, each having a different length, to allow users to reach different areas of a wall or ceiling. This necessitates detaching one handle and attaching a different handle each time the user needs to reach a different area. When a corner finisher is used to apply the finish coat, the handle typically includes a corner box that includes a supply of mud. When the corner box needs to be refilled, users may prefer to detach the corner finisher from the corner box, which again requires detaching and reattaching the corner finisher to the handle.

Detaching and reattaching the handle from conventional drywall finishers requires that the ball joint be disassembled and reassembled, respectively. There currently are two common techniques for holding the ball joint together. In one approach, a sliding plate is positioned in a groove behind the ball of the ball joint. This plate has a keyway-shaped structure with a narrower width at one end and a wide enough width to allow the ball to pass at its other end. As the finisher gets caked with mud, it can get increasingly difficult to manually slide this plate, which is commonly accomplished by pushing a small tab with a thumb against the force of the cured and partially cured mud between much of the length of the plate and the groove in which the plate is received. The narrow width of the slot, necessary to retain the ball in place, restricts the range of angular movement of the handle with respect to the rest of the tool. From time to time, the shaft of the handle catches the edge of the slot where it changes from the large width for removing the ball to the narrow width for retaining the ball. This can slide the plate forward, risking aligning the ball with the wider part of the plate and dropping the tool.

Some manufacturers take another approach to keep the ball joint together. These manufacturers position a spring-like retaining clip behind the ball and is held in place with a spinner. Manipulating the relatively small spinner and retaining clip can be awkward even when the finisher is clean; the task becomes even more unwieldy as the spinner and clip get caked with mud. The retaining clip will tend to fatigue over time. Eventually, this fatigue will make the retaining clip less secure and significantly increase the risk of dropping the tool off the end of the handle. These relatively costly tools require tight tolerances to ensure a quality finish and dropping the tool can significantly damage the tool, sometimes rendering it unusable.

DETAILED DESCRIPTION

A. Overview

Various embodiments of the present invention provide various drywall tools and methods of using drywall tools, e.g., to finish drywall joints. One particular embodiment of the invention provides a drywall tool having a body and a retainer. The body has a drywall compound distributing surface, a rear surface, a recess adapted to pivotably receive a rounded connector of a handle, and an orifice providing a fluid path from the recess to the distributing surface. The retainer is carried by the body and adapted to releasably retain the rounded connector in the recess in the body. The retainer includes first and second rotatable members. The first rotatable member is disposed in a first position relative to the recess and is rotatable about a first axis from a closed position to an open position. The first rotatable member also has a non-uniform circumference with respect to the first axis such that a surface of the first rotatable member is spaced farther from a recess axis of the recess when in its open position than when in its closed position. The second rotatable member is disposed in a second position relative to the recess and is rotatable about a second axis from a closed position to an open position. The second rotatable member has a non-uniform circumference with respect to the second axis such that a surface of the second rotatable member is spaced farther from the recess axis when in its open position than when in its closed position. The first and second positions are angularly spaced from one another about the recess axis.

A drywall tool in accordance with another embodiment of the invention includes a body, a handle, and a retainer. The body includes a recess and an orifice in communication with the recess, the orifice defining a fluid path for a process fluid, e.g., drywall compound. The handle has a ball pivotably received in recess and being adapted to deliver the process fluid therethrough. The retainer is carried by the body and comprises first and second rods. The first rod is pivotable about a first axis and includes a first abutting surface and a first recessed surface arranged on a circumference of the first rod. The first recessed surface has a minimum distance from the first axis that is less than a minimum distance from the first abutting surface to the first axis. The second rod is pivotable about a second axis and includes a second abutting surface and a second recessed surface arranged on a circumference of the second rod. The second recessed surface has a minimum distance from the second axis that is less than a minimum distance from the second abutting surface to the second axis. The first and second rods are positioned with respect to one another such that a first distance between the first and second abutting surfaces is less than a dimension of the ball when the first and second rods are in a first relative orientation, thereby retaining the ball in the recess. Also, a second distance between the first and second recessed surfaces is greater than the dimension of the ball when the first and second rods are in a second relative orientation, thereby permitting the ball to be removed from the recess.

For ease of understanding, the following discussion is broken down into two areas of emphasis. The first section describes aspects of drywall tools in certain embodiments of the invention. The second section outlines methods of using drywall tools in accordance with other embodiments of the invention.

B. Drywall Tools

Embodiments of the invention provide drywall tools, e.g., tools for finishing drywall joints. Many of these embodiments employ robust, simple-to-use release mechanisms to releasably retain the ball of a ball joint.

FIGS. 1–9 schematically illustrate a corner finisher 100 in accordance with a particular embodiment of the invention. Although this particular embodiment is typified in the drawings as a corner finisher, embodiments of the invention can employ a variety of other drywall finishers. Aspects of the invention may also be used in other, non-drywall-related tools that would benefit from a readily detachable ball joint.

Figure 1:
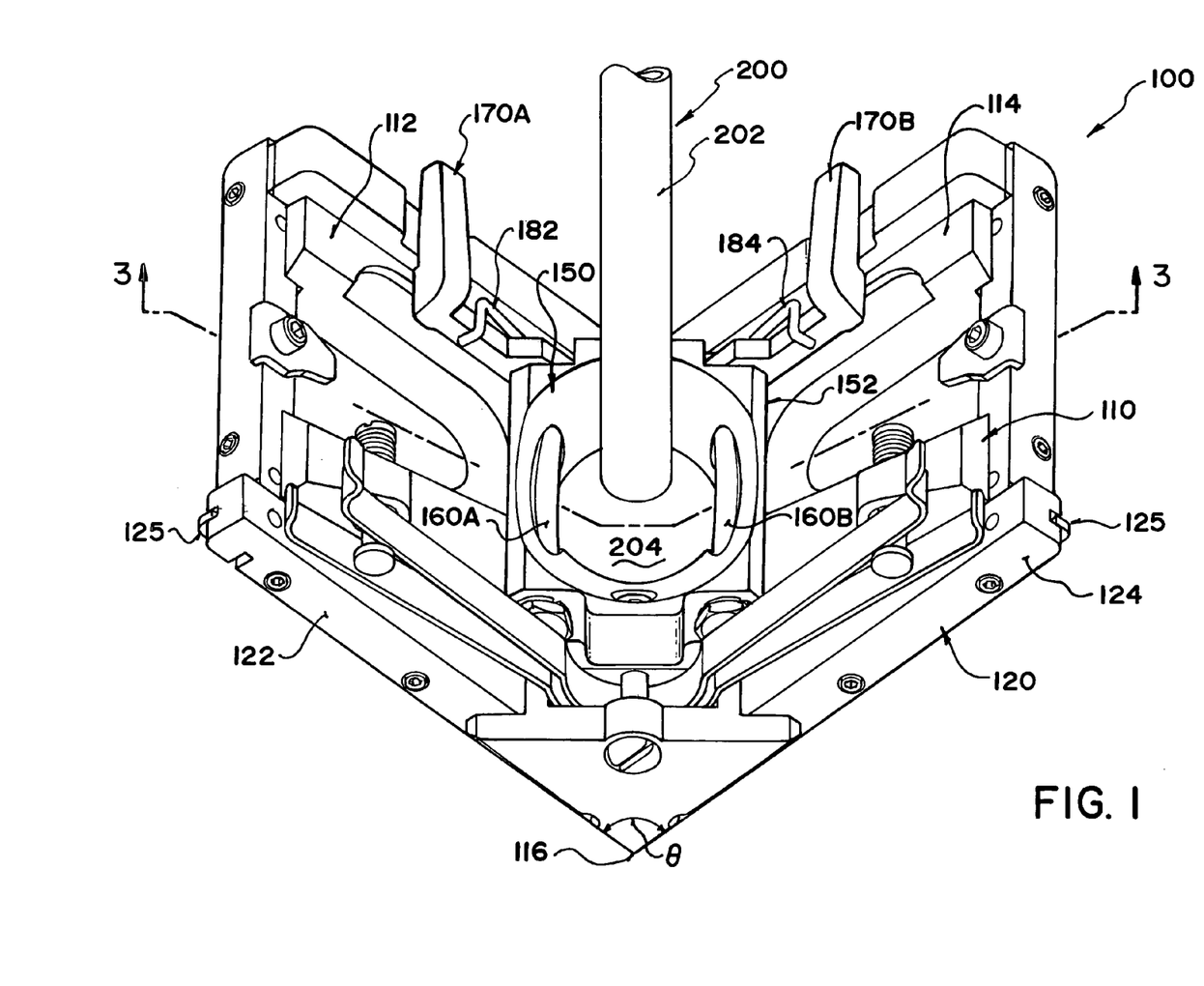
FIG. 1 is a schematic perspective view showing a drywall tool in accordance with an embodiment of the invention with a handle ball retained in the body of the tool.

The corner finisher 100 generally includes a body 110, a retainer 150, and a handle 200. The body 110 may comprise a first panel 112 and a second panel 114 that are joined at an angle (FIG. 1). This angle is typically about 90 degrees, though other angles could be used in specialty applications. The panels 112 and 114 may be formed separately or integrally molded or machined. The body 110 may be adapted to carry a frame 120 that includes at least two blades 125 that serve to spread the mud across the surface of the drywall. The frame 120 may include a first frame segment 122 and a second frame segment 124 that are initially oriented at about the same angle (FIG. 1) with respect to one another, but have some freedom of movement to allow for deviations from an ideal joint. Such frames 120 are well known in the art. As is also known in the art, a front surface (118 in FIG. 3) of the body 110 may serve to distribute mud to the drywall through channels (not shown) in the front surface 118.

Figures 3, 4, 4A:
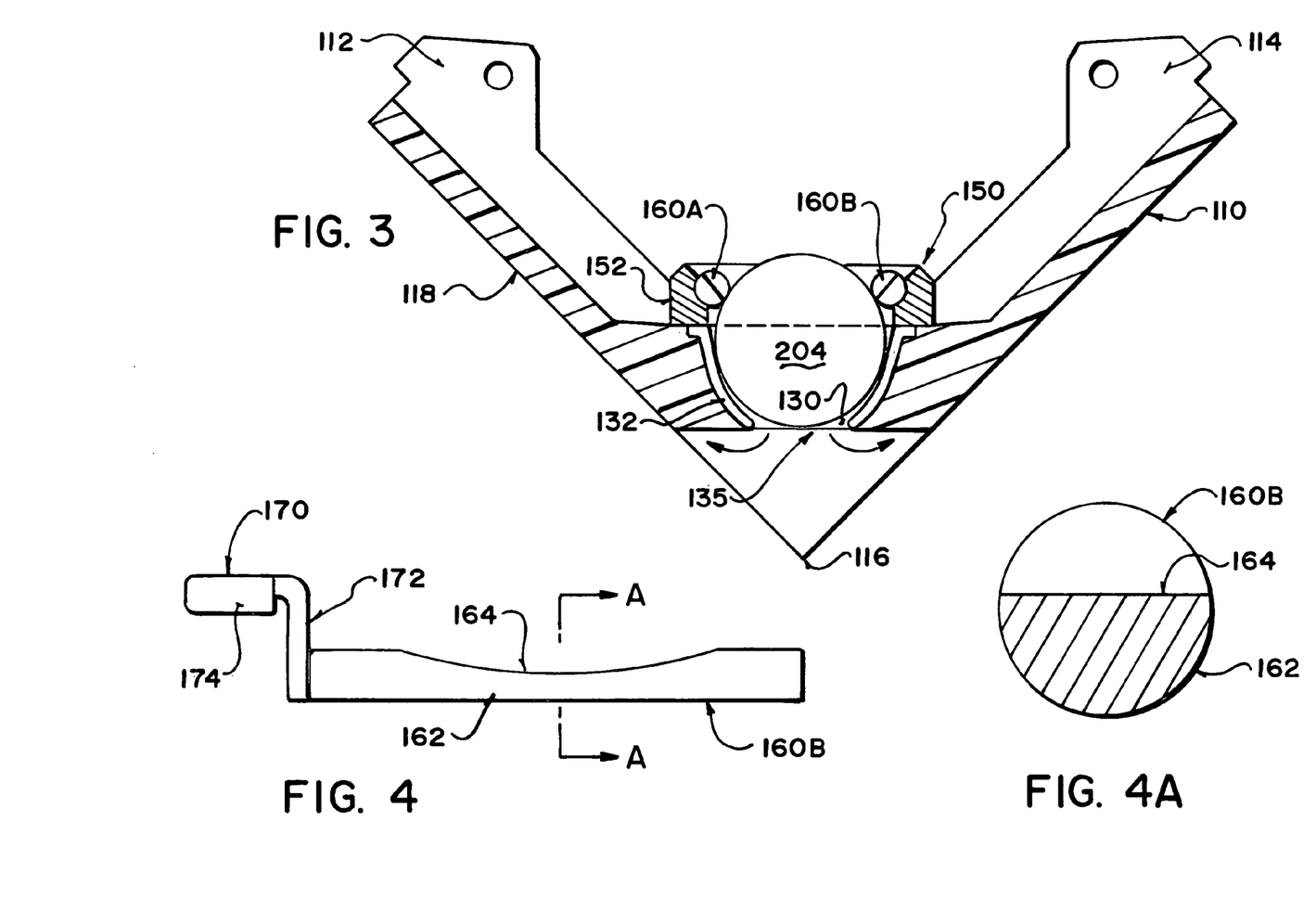
FIG. 3 is a schematic cross-sectional view taken along line 3—3 of FIG. 1.
FIG. 4 is a schematic side view of a retaining rod that may be used in the drywall tool of FIGS. 1–3.
FIG. 4A is a schematic cross-sectional view taken along line A—A in FIG. 4.

As shown in FIG. 3, the body 110 includes a recess 130 that is adapted to receive the ball 204 of a tool handle 200. (The shaft 202 of the handle 200 has been omitted from FIG. 3 for purposes of clarity. It should be also noted that the frame 120 has also been omitted in FIG. 3 to better show the body 110 and its relationship with the ball 204 and retainer 150.) The recess 130 may be adapted to fairly closely receive the ball 204 of the handle 200 (FIG. 1), but the ball 204 should be free to pivot within the recess 130. If so desired, a separate ware insert 132 may be disposed within the recess 130, serving as a replaceable wire liner to protect the body 110. The recess 130 is in fluid communication with an orifice 135 that extends through any remaining thickness of the body 110 at the front end (i.e., the end toward the apex 116) of the body 110. The remainder of the material between the orifice 135 and the apex 116 may be omitted. When the corner finisher 100 is in use, the drywall joint will form a fluid-receiving chamber and the drywall mud may flow into this chamber and outwardly along the outer face 118 of the body 110 through distribution channels (not shown). As is also known in the art, the mud may be delivered to the orifice 135, and hence to the drywall joint being treated via the handle 200. A variety of fluid delivery systems may be incorporated into the handle 200, including a conventional corner box (not shown) or a pumping system, e.g., the pumping system disclosed in U.S. Pat. No. 5,882,691, the entirety of which is incorporated herein by reference.

The body 110 also carries the retainer 150. The retainer 150 includes a base 152 that may be attached to the body 110 in any suitable fashion, e.g., by one or more screws 154. The base may include a pair of spaced-apart channels, each of which is adapted to rotatably receive a length of a rod 160. In particular, a first rod 160a is received in a first channel in the base 152 and a second rod 160b is received in a second channel in the base 152. The rods 160 are spaced from one another about the circumference of the recess 130. The relative location of these rods 160 can be varied as desired. In the particular embodiment shown in the drawings, the first rod 160a is rotatable about a first axis that extends along one side of the recess and the second rod 160b is rotatable about a second axis that may be generally parallel to the first axis. As a consequence, the rods 160 may be disposed at diametrically opposite positions about a periphery of the recess 130.

As shown in FIG. 3, the body 110 includes a recess 130 that is adapted to receive the ball 204 of a tool handle 200. (The shaft 202 of the handle 200 has been omitted from FIG. 3 for purposes of clarity. It should be also noted that the frame 120 has also been omitted in FIG. 3 to better show the body 110 and its relationship with the ball 204 and retainer 150.) The recess 130 may be adapted to fairly closely receive the ball 204 of the handle 200 (FIG. 1), but the ball 204 should be free to pivot within the recess 130. If so desired, a separate wire insert 132 may be disposed within the recess 130, serving as a replaceable wire liner to maintain attachment of body 110 to handle 200. The recess 130 is in fluid communication with an orifice 135 that extends through any remaining thickness of the body 110 at the front end (i.e., the end toward the apex 116) of the body 110. The remainder of the material between the orifice 135 and the apex 116 may be omitted. When the corner finisher 100 is in use, the drywall joint will form a fluid-receiving chamber and the drywall mud may flow into this chamber and outwardly along the outer face 118 of the body 110 through distribution channels (not shown). As is also known in the art, the mud may be delivered to the orifice 135, and hence to the drywall joint being treated via the handle 200. A variety of fluid delivery systems may be incorporated into the handle 200, including a conventional corner box (not shown) or a pumping system, e.g., the pumping system disclosed in U.S. Pat. No. 5,882,691, the entirety of which is incorporated herein by reference.

The retainer 150 may also include a means for biasing the actuating arms 170 away from one another and toward an engagement with the respective panel 112 or 114 of the body 110. Any suitable biasing means can be employed. In the illustrated embodiment, the biasing means takes the form of a torsion spring 180 carried on a post 185 of the base 152. A first leg 182 of the torsion spring 180 engages the first arm 170a and a second leg 184 of the torsion spring 180 engages the second arm 170b. The biasing force of the spring 180 urges the actuating arms 170 toward the panels 112, 114 of the body 110, defining a default position of the rods 160 with respect to one another and with respect to the base 152 of the retainer 150.

Each of the rods 160 may have a non-uniform circumference along at least a portion of its length. In particular, each rod 160 may include an abutting surface 162 and an elongate recessed surface arranged with respect to one another on the circumference of the rod 160. The particular embodiment shown in the drawings (see, e.g., FIG. 4) includes an elongate, concave recessed surface 164 that defines a reduced-thickness portion of the rod 160. When the rods 160a and 160b are in their default positions (FIGS. 1 and 2), the abutting surfaces 162 are positioned to extend inwardly of the adjacent portion of the opening in the base 152. This defines a maximum distance $d_1$ between the abutting surfaces 162a and 162b.

This distance $d_1$ is no greater than, and is desirably less than, a maximum dimension (e.g., the diameter) of the ball 204 to be received in the recess 130. As a consequence, the abutting surfaces 162 of the rods 160 will engage a surface of the ball to counteract any force that would tend to dislodge the ball 204 from the recess 130. Hence, the ball 204 is free to pivot within the recess 130, but is retained in the recess 130 by the retainer 150. It is also worth noting that the recessed surfaces 164 of the rods 160 are arranged at an oblique angle with respect to the axis of the recess 130. This increases clearance between the rods 160 and the shaft 202 of the handle 200, affording a surprisingly wide range of angular movement of the handle 200 with respect to the base 110 during use. This is in contrast to the conventional plate-type ball-retaining systems which, as discussed in the Background above, can materially limit this range of movement.

Figure 5:
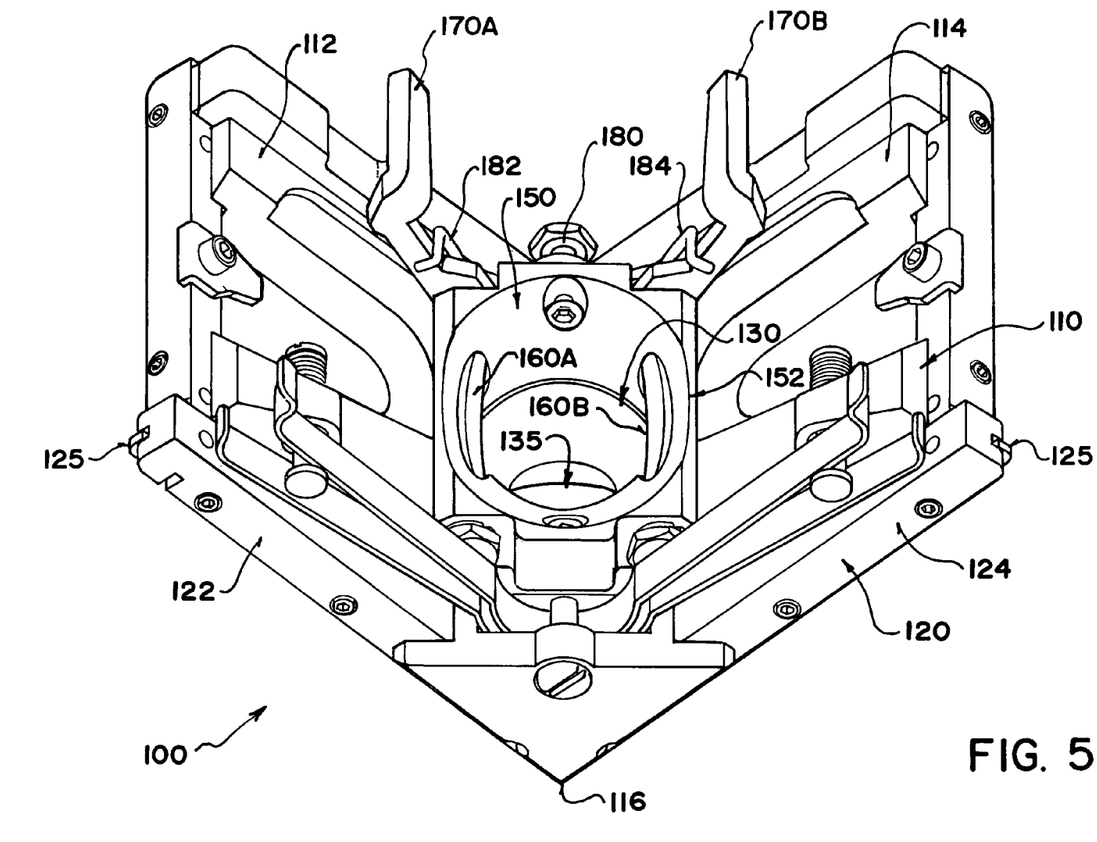
FIG. 5 is a schematic perspective view showing the drywall tool of FIG. 1 in a first transitional stage between a closed state with the ball retained in place and an open state wherein the ball can be removed.
Figure 6:
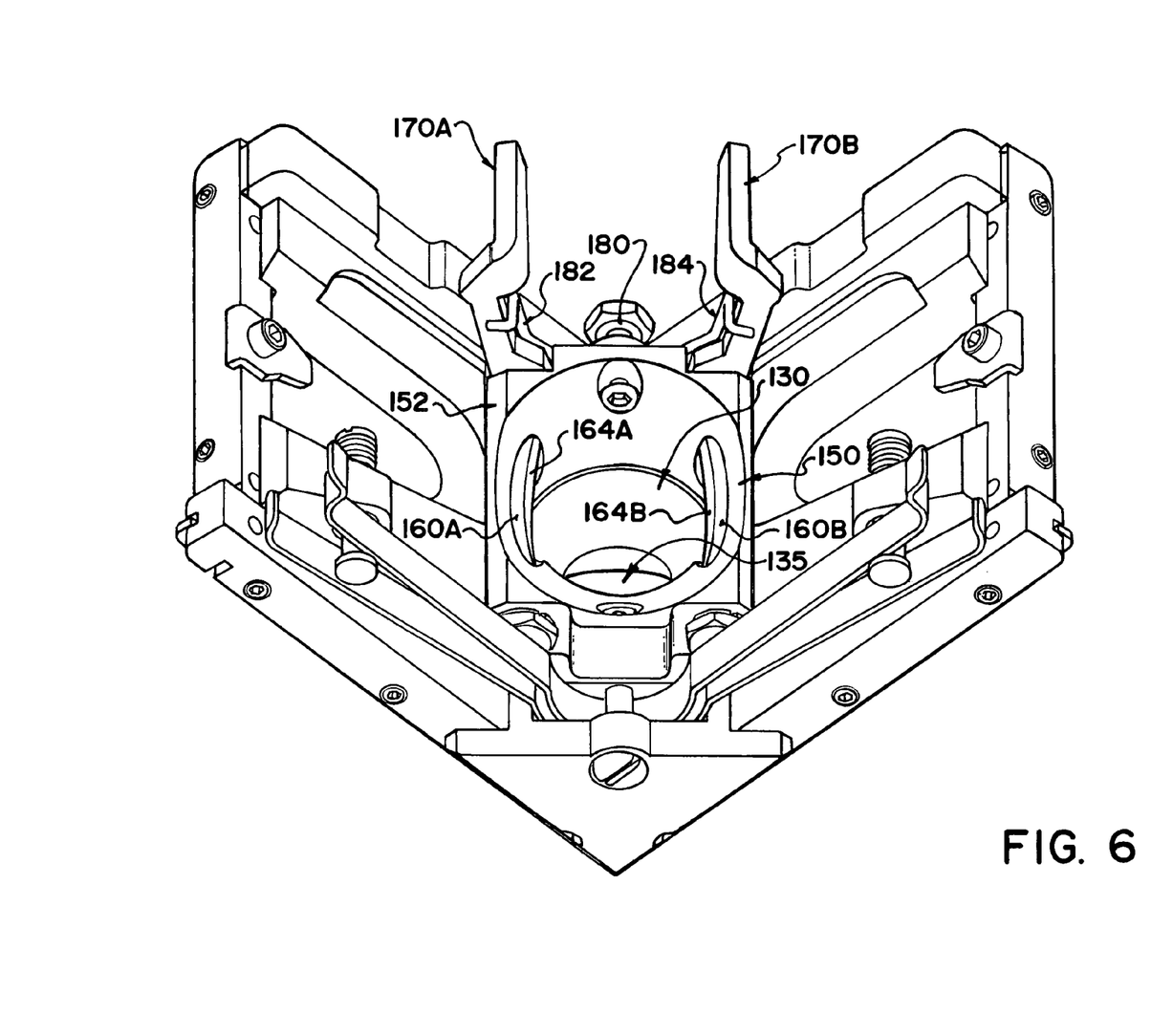
FIG. 6 is a schematic perspective view showing the drywall tool of FIG. 1 in a second, subsequent transitional stage between its closed state and its open state.
Figure 7:
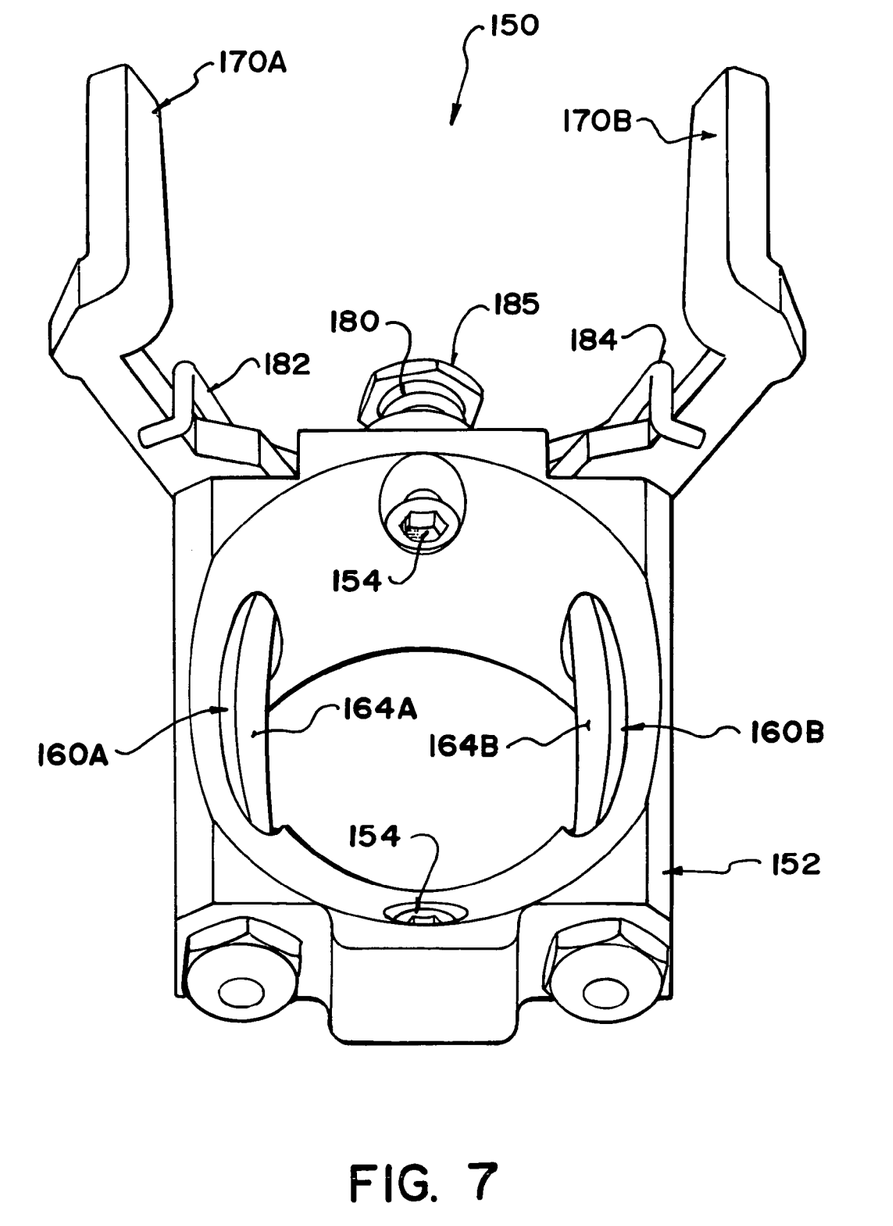
FIG. 7 is a schematic perspective view of selected components of the drywall tool of FIG. 1 in the second transitional stage shown in FIG. 6.
Figure 8:
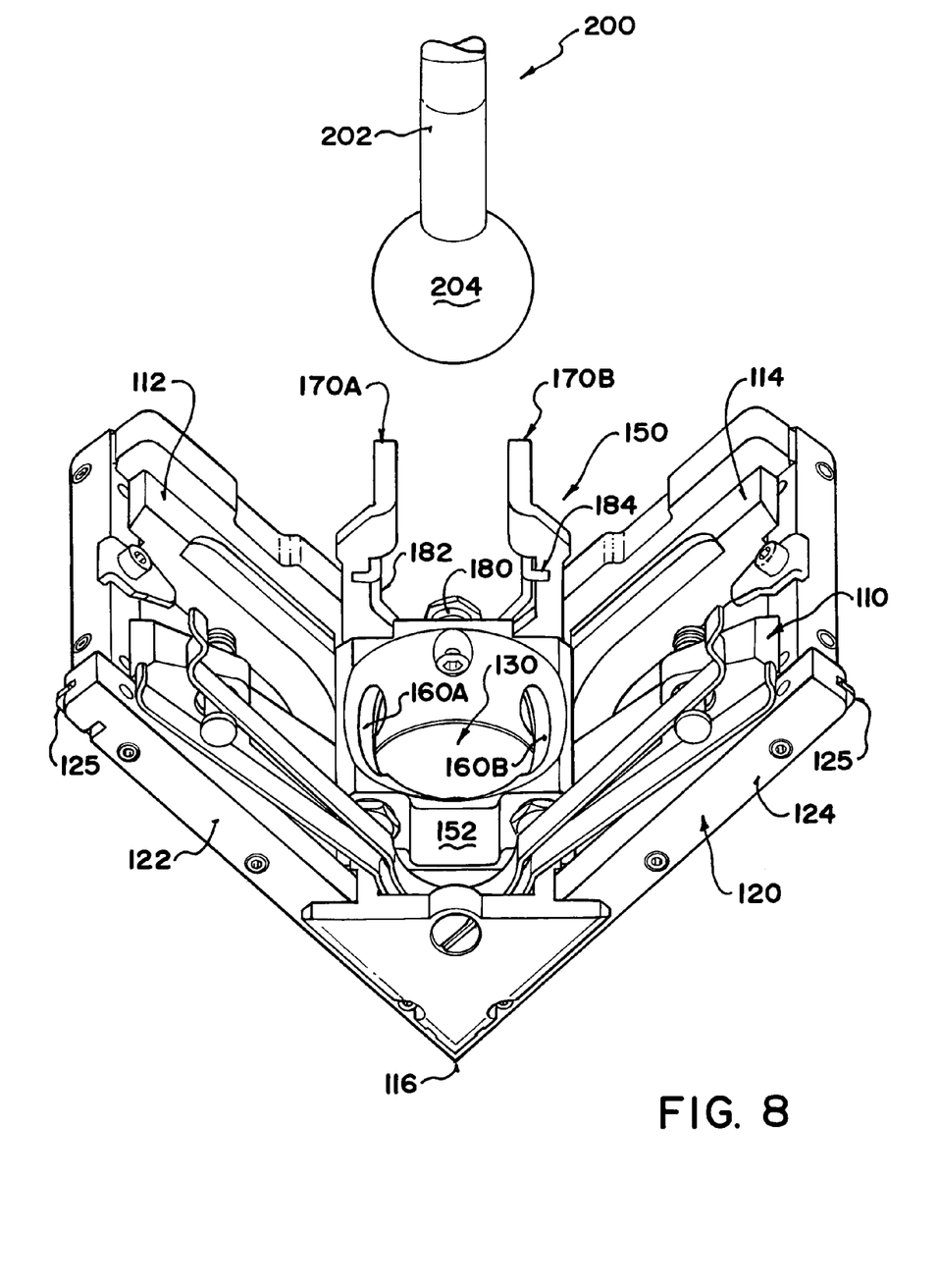
FIG. 8 is a schematic perspective view showing the drywall tool of FIG. 1 in its open state with the ball and the associated handle lifted away from the body of the tool.
Figure 9:
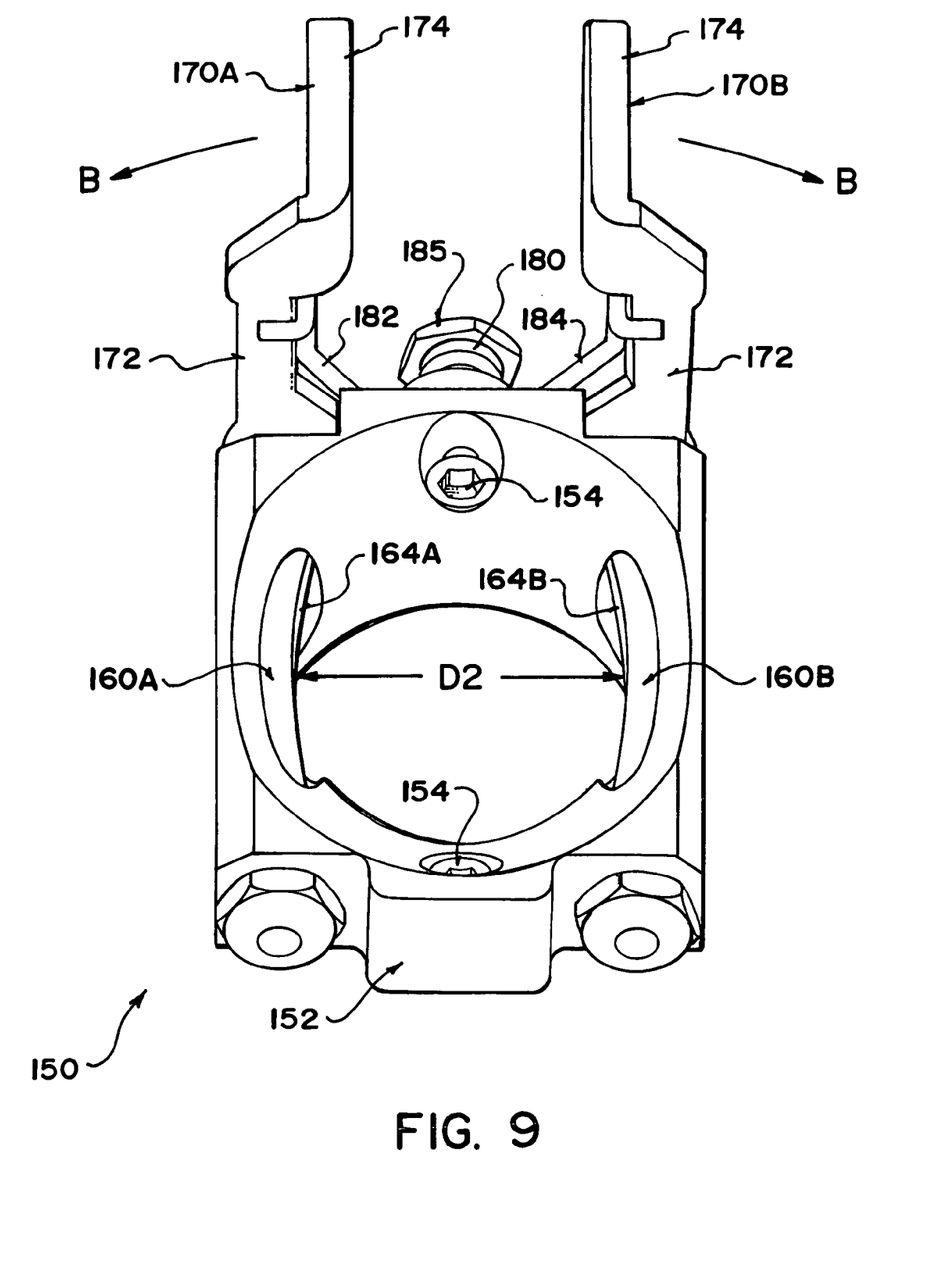
FIG. 9 is a schematic perspective view showing selected components of the drywall tool of FIG. 1 in the open state illustrated in FIG. 8.

FIGS. 5–7 illustrate successive positions of the rods 160 and arms 170 as the rods are moved from a first relative orientation (FIGS. 1 and 2) to a second relative orientation (FIGS. 8 and 9). As suggested in this series of drawings, the recessed surfaces 164 of the rods 160 will move from a position wherein they are oriented generally obliquely with respect to one another and with respect to a vertical axis of the recess 130 toward a position wherein the recessed surfaces 164 are generally facing one another. FIG. 8 illustrates the corner finisher 100 with the retainer 150 in a second relative orientation that permits the ball 204 of the handle 200 to be removed from the recess 130. In this orientation, the recessed surfaces 164 of the rods 160 are directly opposed with one another.

Figure 2:
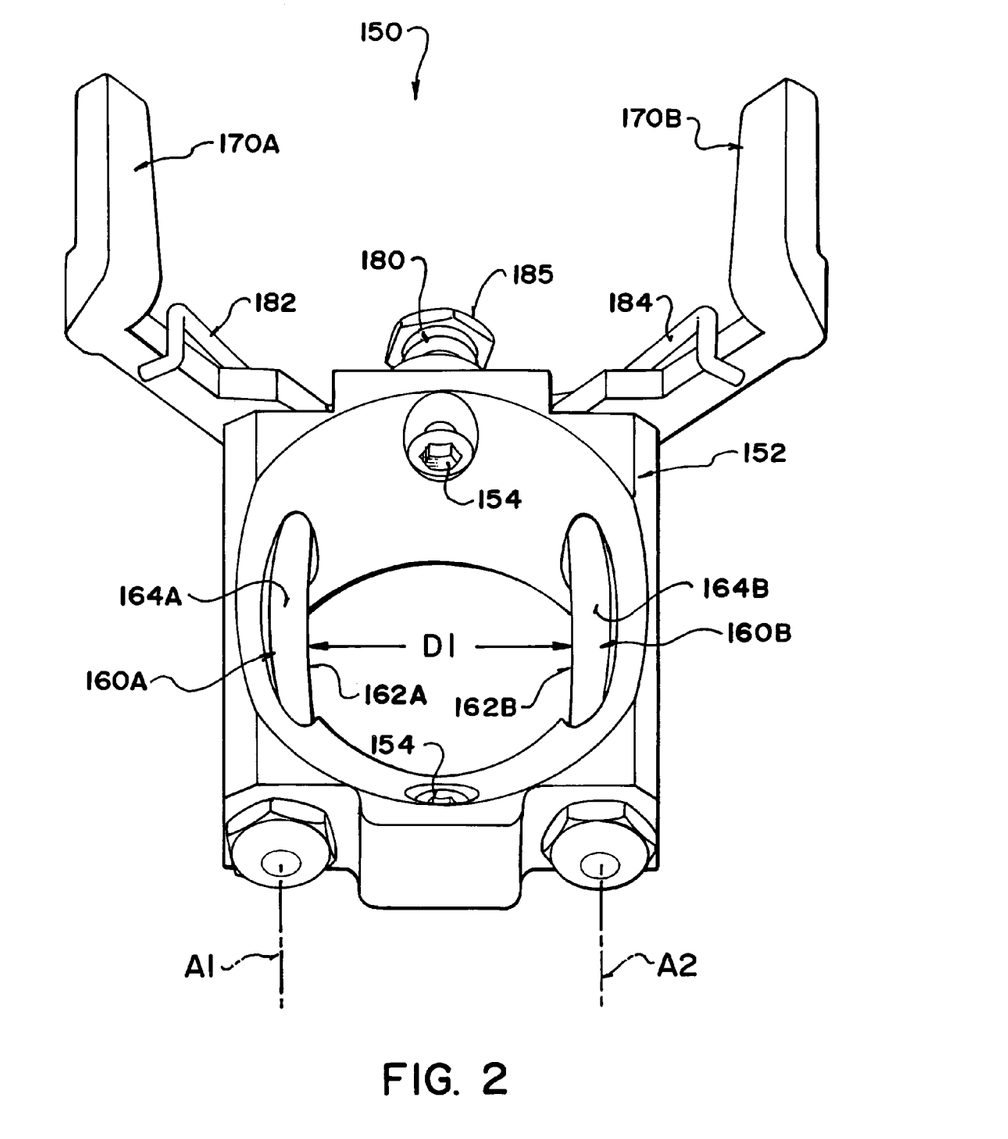
FIG. 2 is a schematic perspective view of selected components of the drywall tool of FIG. 1.

As noted above, the rods 160 have a reduced thickness adjacent the recessed surfaces 164. By virtue of orienting these two reduced-thickness portions with the recessed surfaces 164 generally opposed to one another, the distance ($d_2$ in FIG. 9) between the recessed surfaces 164 is greater than the distance $d_1$ (FIG. 2) between the abutting surfaces 162 when the rods 160 are in their first relative orientation (FIGS. 1 and 2). The distance $d_2$ between these recessed surfaces 164 should be at least as great as, and desirably slightly greater than, a maximum dimension of the ball 204. As a consequence, the ball may be freely lifted out of the recess 130. Once the ball 204 is removed from the recess, the user may let go of the arms 170, allowing the biasing force (B in FIG. 9) of the torsion spring 180 to return the arms 170 toward their default position (FIGS. 1 and 2).

Hence, the retainer 150 allows a user to release the ball 204 of the handle 200 from the body 110 of the corner finisher 100 quickly and easily. When the rods 160 are in their first relative orientation (FIGS. 1 and 2), they define a closed position of the retainer 150 that will retain the ball 204 in the recess 130. Simply by manually squeezing the arms 170 toward one another, the user can move the rods 160 to a second relative orientation in which the ball 204 may be removed from the recess 130. This defines an open position of the retainer 150.

The illustrated embodiment employs two rods 160a and 160b. If so desired, though, the retainer 150 may include a single rod that extends inwardly from one side of the recess 130. In one embodiment, the rods 160 may be linked to one another, e.g., with a gear mechanism so that movement of one of the actuating arms 170 will rotate both of the rods 160. In one advantageous implementation, though, the rods 160a and 160b are rotatable within their respective channels independently of one another by independently moving the associated arm 170a or 170b. In one embodiment, moving just one of the rods, e.g., the first rod 160a, from its closed position (FIGS. 1 and 2) to its open position (FIGS. 8 and 9) may allow sufficient clearance to remove the ball 204. More preferably, the rods 160 may be spaced from one another such that moving just one of the rods will not give sufficient clearance to remove the ball 204 from the recess 130. This will reduce the risk that the handle 200 will accidentally detach from the base 110 by a user's inadvertently bumping or pressing against one of the arms 170 during use.

As noted above, the retainer 150 can be arranged to provide a greater range of angular motion of the handle 200 with respect to the base 210 than the conventional plate-type ball retention systems used in the art. Systems using a spring-like retaining clip that interferes with handle movement less than the plate-type systems tend to become less secure over time, leading to dropping the tools from the handles during use. The rods 160 in the illustrated corner finisher 100 can be sturdy, relatively rigid rods that can securely retain the ball 204 in place even after repeated use. One further advantage of the illustrated design is that the actuating arms 170 provide leverage to rotate the rods 160.

This can reduce the likelihood that the retainer will become too caked with mud to readily release the ball 204 from the recess.

C. Methods of Using Drywall Tools

As noted above, other embodiments of the invention provide methods of using drywall tools. The following discussion outlines these embodiments in connection with the particular corner finisher 100 shown in FIGS. 1–9 and discussed above. This is solely for purposes of illustration. In particular, the methods discussed herein may be practiced using any suitable tool capable of carrying out the methods.

One particular embodiment provides a method of finishing a drywall joint. In this embodiment, the handle 200 may be moved to move the corner finisher 100 along a drywall joint. If the drywall joint is not a corner joint, another type of finisher could be used instead. This may be accomplished with the rods 160 in their closed position, e.g., the positions shown in FIGS. 1 and 2.

At a suitable time, e.g., completion of all of the corner drywall joints to be finished, the handle 200 may be detached from the balance of the corner finisher 100. This may be accomplished by rotating one or both of the rods 160a and 160b about their respective axes ($A_1$ and $A_2$ in FIG. 2). For example, the user may urge the two actuating arms 170a and 170b toward one another against the biasing force of the torsion spring 180. This will orient the recessed surfaces 164 of the rods 160 proximate the recess 130, allowing the ball 204 to be removed.

This process can be repeated as desired. For example, the corner finisher may be used to wipe down excess mud from a joint using a standard handle 200. The handle 200 may then be detached from the body 110 of the corner finisher 100. Thereafter, the user may squeeze the actuating arms 170 toward one another to position the rods 160 in their open positions so the ball of a corner box (not shown) may be positioned in the recess. As is known in the art, mud may be delivered to the front surface 118 (FIG. 3) of the body 110 through the ball 204 and the orifice 135 (FIG. 3) as the user move the handle to move the corner finisher along the drywall joint.

The above-detailed embodiments and examples are intended to be illustrative, not exhaustive, and those skilled in the art will recognize that various equivalent modifications are possible within the scope of the invention. For example, whereas steps are presented in a given order, alternative embodiments may perform steps in a different order. The various embodiments described herein can be combined to provide further embodiments.

In general, the terms used in the following claims should not be construed to limit the invention to the specific embodiments disclosed in the specification unless the preceding description explicitly defines such terms. The inventors reserve the right to add additional claims after filing the application to pursue additional claim forms for other aspects of the invention.

I claim:

1. A drywall tool comprising:
   a body having a drywall compound distributing surface, a rear surface, a recess adapted to pivotably receive a rounded connector of a handle, and an orifice providing a fluid path from the recess to the distributing surface;
   a retainer carried by the body and adapted to releasably retain the rounded connector in the recess in the body, the retainer comprising:
      a first rotatable member that is disposed in a first position relative to the recess and that is rotatable about a first axis from a closed position to an open position, the first rotatable member having a non-uniform circumference with respect to the first axis such that a surface of the first rotatable member is spaced farther from an axis of the recess when in its open position than when in its closed position; and
      a second rotatable member that is disposed in a second position relative to the recess and that is rotatable about a second axis from a closed position to an open position, the second rotatable member having a non-uniform circumference with respect to the second axis such that a surface of the second rotatable member is spaced farther from the axis of the recess when in its open position than when in its closed position, the first and second positions being angularly spaced from one another about the recess axis;
   wherein the first rotatable member is biased toward the closed position.

2. The drywall tool of claim 1 further comprising a spring that biases the first rotatable member toward its closed position.

3. The drywall tool of claim 1 wherein the second rotatable member is biased toward its closed position.

4. The drywall tool of claim 1 wherein the first and second rotatable members are manually moveable against a biasing force from their respective closed positions to their respective open positions.

5. A manually operable tool, comprising:
   a body having a recess and an orifice in communication with the recess, the orifice defining a fluid path for a process fluid;
   a handle having a ball, the ball being pivotably received in the recess and being adapted to deliver the process fluid therethrough; and
   a retainer carried by the body, the retainer comprising:
      a first rod pivotable about a first axis and includes a first abutting surface and a first recessed surface arranged on a circumference of the first rod, the first recessed surface having a minimum distance from the first axis that is less than a minimum distance from the first abutting surface to the first axis; and
      a second rod pivotable about a second axis and includes a second abutting surface and a second recessed surface arranged on a circumference of the second rod, the second recessed surface having a minimum distance from the second axis that is less than a minimum distance from the second abutting surface to the second axis;
      the first and second rods being positioned with respect to one another such that a first distance between the first and second abutting surfaces is less than a dimension of the ball when the first and second rods are in a first relative orientation, thereby retaining the ball in the recess, and a second distance between the first and second recessed surfaces is greater than the dimension of the ball when the first and second rods are in a second relative orientation, thereby permitting the ball to be removed from the recess.

6. The drywall tool of claim 5 wherein the body comprises a body of a drywall corner finisher.

7. The drywall tool of claim 5 wherein the surface of the first rotatable member is spaced from the surface of the second rotatable member a first distance when the first and second rotatable members are in their respective closed positions and a second distance, which is greater than the first distance, when the first and second rotatable members are in their respective open positions.

8. The drywall tool of claim 5 wherein the first and second rods are positioned generally diametrically opposite one another across the recess.

9. The drywall tool of claim 5 wherein the recessed surface of the first rod comprises an elongate concavity extending along a length of the surface of the first rod.

10. The drywall tool of claim 5 wherein the first rod member is biased toward a position wherein the abutting surface is positioned to engage the ball.

11. The drywall tool of claim 5 wherein the first and second rods are manually moveable against a biasing force from the first relative orientation to the second relative orientation.

12. The drywall tool of claim 5 wherein the first and second rods are biased toward the first relative orientation.

13. A method of finishing a drywall joint, comprising:
    moving a handle to move a finishing tool along the drywall joint, the handle being attached to the finishing tool by a ball joint in which the handle carries a ball and the finishing tool includes a recess that pivotably receives the ball and a retainer adapted to retain the ball in the recess;
    detaching the handle from the finishing tool by rotating at least one retaining member of the retainer about an axis oriented tangentially to an axis of the recess from a first position to a second position, the retaining member in its first position having an abutting surface positioned to limit movement of the ball away from the recess and the retaining member in its second position having a recessed surface spaced from the axis of the recess a distance sufficient to allow the ball to be removed from the recess.

14. The method of claim 13 further comprising delivering a drywall compound to the drywall joint through the ball and the finishing tool.

* * * * *

Disclaimer and Dedication 7,114,869 B2—Donald Mark MacMillan, Richmond (CA). BALL JOINT SYSTEM FOR DRYWALL FINISHING TOOLS. Patent dated October 3, 2006. Disclaimer filed May 3, 2010, by the inventor.

Hereby enters this disclaimer to all claims, 1-14 and the entire term remaining on said patent and dedicate the same to the public.

*(Official Gazette, June 8, 2010)*